(12) United States Patent
Wilhelmy

(10) Patent No.: US 7,248,038 B2
(45) Date of Patent: Jul. 24, 2007

(54) DEVICE FOR THE DETECTION OF MOVEMENTS AND/OR POSITIONS OF AN OBJECT

(75) Inventor: Lothar Wilhelmy, Berlin (DE)

(73) Assignee: Hubner Electromaschinen GmbH, Berlin (DE)

( * ) Notice: Subject to any disclaimer, the term of this patent is extended or adjusted under 35 U.S.C. 154(b) by 0 days.

(21) Appl. No.: 10/580,449

(22) PCT Filed: Nov. 24, 2004

(86) PCT No.: PCT/EP2004/013547

§ 371 (c)(1), (2), (4) Date: May 23, 2006

(87) PCT Pub. No.: WO2005/052505

PCT Pub. Date: Jun. 9, 2005

(65) Prior Publication Data

US 2007/0096722 A1    May 3, 2007

(30) Foreign Application Priority Data

Nov. 26, 2003   (DE)  ................. 103 55 859
Nov. 11, 2004   (DE)  ............... 10 2004 055 626

(51) Int. Cl.
*G01B 7/30* (2006.01)
*G01R 33/07* (2006.01)

(52) U.S. Cl. .............................. 324/207.25; 324/207.2; 324/251

(58) Field of Classification Search ........ 324/173–174, 324/207.24, 207.25, 207.2, 251
See application file for complete search history.

(56) References Cited

U.S. PATENT DOCUMENTS 6,249,118 B1    6/2001   Palfenier
2003/0094945 A1    5/2003   Netzer

*Primary Examiner*—Bot LeDynh
(74) *Attorney, Agent, or Firm*—Mark P. Stone

(57) ABSTRACT

The invention relates to a device for detecting movements and/or positions of an object with the aid of voltage pulses induced by the field of adjacent magnets (6, 7) in a coil (4). In order to generate a sufficiently strong signal also at small relative speeds between the magnets (6, 7) and the coil (4), the coil (4) encloses a spring (5) in which a quick fore-and-aft movement can be induced by the magnetic fields of the magnets (6, 7), the magnetic poles of the spring (5) being reversed during said fore-and-aft movement.

33 Claims, 13 Drawing Sheets

DEVICE FOR THE DETECTION OF MOVEMENTS AND/OR POSITIONS OF AN OBJECT

TECHNICAL FIELD

The invention relates to an apparatus for the detection of movements and/or positions of an object, in which a voltage pulse is in each case produced as a function of the movements and/or positions of the object in at least one coil, by means of at least two magnets which carry out a relative movement with respect to the coil and act on it with their fields, with the north-south axes of the respective two adjacent and opposite-polarity magnets which form a magnet pair being oriented, in the same way as the longitudinal axis of the coil, essentially at right angles to the movement direction of the object.

PRIOR ART

An apparatus of the above type in the form of a tachometer is known from DE 102 19 303 C1. In the known apparatus, the moving object is formed by a hollow shaft on which a magnet supporting arm is mounted such that it can pivot and is fitted with two magnets of opposite polarity which are offset with respect to one another in the direction of the longitudinal axis of the hollow shaft. Coils are arranged at a distance from the shaft and over the circumference of the shaft and supply voltage pulses to an evaluation unit under the influence of the fields of the magnets passing them. The coils are held by webs which form coil cores and connect magnetically permeable ring segments to an outer ring which surrounds the ring segments and the coils and is likewise magnetically permeable. Further ring segments are arranged between the ring segments to which the coils are fitted, are separated from them by a gap, and are likewise connected to the outer ring. The widths of the gaps between the ring segments in this case correspond essentially to the width of the magnets. The described configuration of the known apparatus means that a rapid pivoting movement of the magnet support arm takes place in the area of the gaps between the ring segments when the shaft is rotating at slow speeds and, as a consequence, this leads to production of a strong voltage pulse in the coils. This results in a sufficiently strong signal for electronic evaluation even at low rotation speeds.

The known apparatus is not regarded as being completely satisfactory because the use of a magnet supporting arm which can pivot and its bearing on the shaft of the tachometer are associated with a comparatively high degree of complexity.

DE 43 42 069 A1 discloses an apparatus with two opposite-polarity magnets, the first of which carries out a movement in synchronism with the object. A second magnet of opposite polarity is associated with this first magnet and is located at one end of a leaf spring, whose other end is attached to a fixed holder. The second magnet is arranged above the movement path of the first magnet. When the first magnet approaches the second magnet during slow movements, the latter is repelled because of its opposite polarity and the leaf spring is deformed, leading to an accumulation of potential spring energy in it. Since the restoring force of the leaf spring increases as the deflection increases, a deflection position is reached, as the movement of the first magnet progresses, at which the restoring force of the leaf spring is greater than the repulsion forces between the first and the second magnet, resulting in the leaf spring springing back, dissipating the potential energy accumulated in it. In order to convert the kinetic energy released as the leaf spring springs back to an electrical pulse, a coil which has an iron core is provided on the side of the second magnet facing away from the path of the first magnet. The magnetic flux which passes through the iron core of this coil is changed in a very short time during the backward movement of the second magnet, so that a voltage pulse is induced in the coil. In order to produce pulses in this apparatus which are sufficiently large, comparatively large magnets are required and a likewise comparatively large leaf spring, in order to store a sufficiently large amount of energy. In other words, the space requirement for the magnets and the leaf spring is comparatively large.

DESCRIPTION OF THE INVENTION

The invention likewise has the aim of inducing sufficiently large voltage pulses in a coil in particular when an object is moving slowly and to achieve this, in contrast to the known solutions, using simpler means.

The stated object is achieved in a first embodiment of the invention in that the magnets are arranged one behind the other in the direction of movement of the object, and the coil at least partially surrounds a spring which is composed of magnetically permeable material and whose end facing the magnets carries out a reciprocating movement as a result of the reluctance effect under the influence of the fields of the magnets of the magnet pair, which reciprocating movement causes a polarity change, which produces the respective voltage pulse, in the magnetic field in the coil.

The apparatus according to the invention is distinguished by a surprisingly simple, compact and maintenance-free design. In this apparatus, the respective leading magnet drives the free end of the spring with it, since the lines of force of this magnet search for the path of least magnetic reluctance, based on the reluctance principle. When the magnet is moved further, then a state is reached in which the restoring force of the spring overcomes the magnetic driving force and the spring moves into the area of the lagging magnet, of opposite polarity, by which it is absorbed with additional acceleration. This means that the spring suddenly reverses the polarity of the magnetic field acting in the coil thus resulting in a strong voltage being produced in the coil surrounding the spring. In general, this remagnetization also takes place at higher speeds of the object when the two adjacent opposite-polarity magnets which form a magnet pair move quickly past the spring, without the spring being able to carry out any significant movements in this case, because of its inertia.

A second solution to the stated problem consists in that the magnets are arranged alongside one another when considered in the direction of their relative movement with respect to the coil and the coil at least partially surrounds a spring which is composed of magnetically permeable material and whose end facing the magnets carries out a reciprocating movement on the basis of the reluctance effect under the influence of the fields of the magnets of the magnet pair, which reciprocating movement causes a polarity change, which produces the respective voltage pulse, in the magnetic field in the coil, with both the pole surfaces of the magnets and that end surface of the leaf spring which faces the pole surfaces of the magnets being essentially in the form of rectangles, whose longitudinal axes include an angle α of less than 60° with the tangent to the movement path of the magnets.

The alternative solution has a further advantage in that force or torque pulsations are reduced to a negligible level. Pulsations such as these have a disturbing effect in the case of the first embodiment of apparatuses in the form of tachometers when the aim is to monitor the rotation speed of relatively small drives.

Further features and details of the invention will become evident from the dependent claims, from the attached, schematic drawings, and from their description in the following text.

APPROACHES TO IMPLEMENTATION OF THE INVENTION

Figure 1:
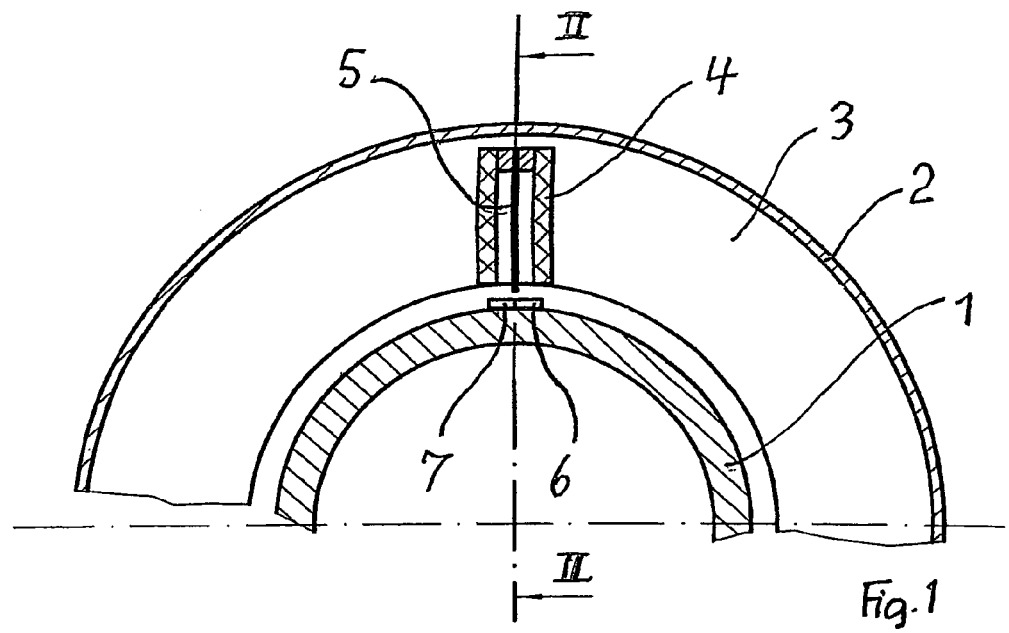
FIG. 1 shows a section through a first apparatus in the form of a tachometer.
Figure 2:
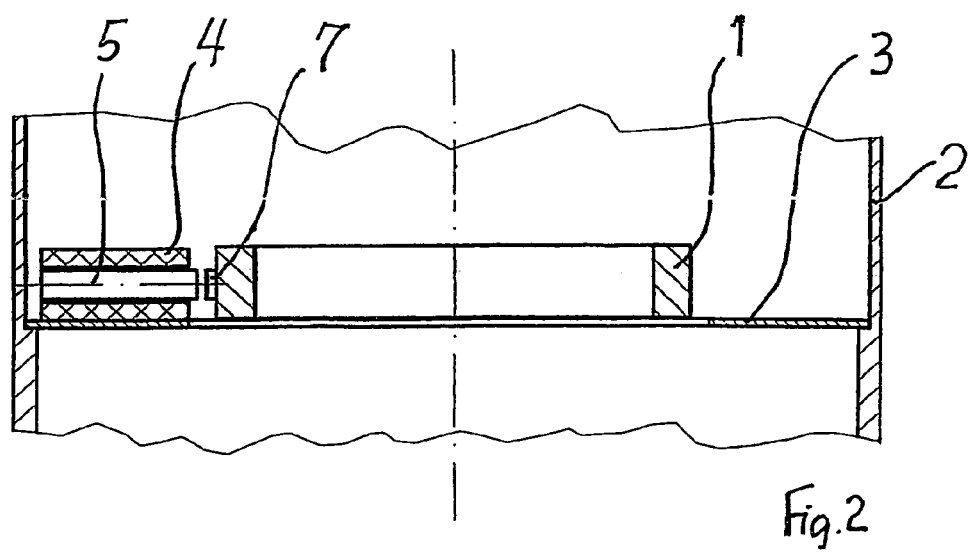
FIG. 2 shows a section along the line II-II in FIG. 1.

In FIGS. 1 and 2, 1 is the hollow shaft of a tachometer which can be connected to a shaft, which is not illustrated but whose revolutions are intended to be counted, such that they rotate together. A coil 4 which surrounds a magnetically permeable spring 5 is mounted on an annular printed circuit board 3 which is connected to the outer wall 2 of the housing of the tachometer. One end of the spring 5, which is in the form of a leaf spring, projects slightly beyond the lower end of the coil 4, and its other end is firmly clamped in at the upper end of the coil 4. That part of the spring 5 which is not clamped in can carry out reciprocating movements in the cavity in the coil 4, as is also described in FIGS. 3a to 3d.

Two magnets 6 and 7 of opposite polarity which form a magnet pair are arranged one behind the other on the circumference of the hollow shaft 1 of the tachometer in the rotation direction of the hollow shaft 1, and their north-south axes run at right angles to the movement direction of the hollow shaft 1, in the same way as the longitudinal axes of the coil 4. In other words, the magnetic fields of the magnets 6, 7 are oriented radially. Owing to the different polarity of the magnets 6, 7, the lines of force 8, 9 run in opposite directions.

FIGS. 3a to 3d—in which the coil 4 has been omitted—show how the spring 5 behaves under the influence of the fields of the magnets 6 and 7 when the magnets 6 and 7 pass the spring's free end.

Figure 3A:
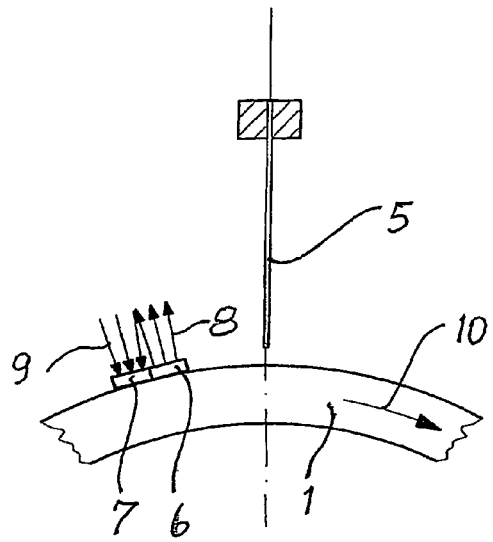
FIGS. 3a-d show, highly schematically, the interaction between those parts of the apparatus as shown in FIGS. 1 and 2 which are used to generate a voltage pulse.
Figure 3B:
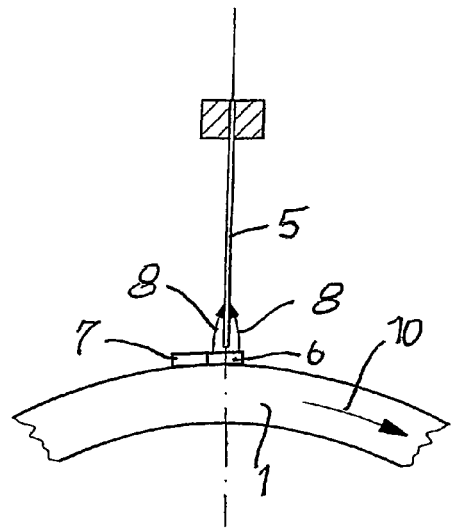

FIG. 3a shows the spring 5 in the stretched rest state. When the hollow shaft 1 rotates in the direction of the arrow 10, that is to say clockwise, then—as shown in FIG. 3b—the magnet 6 first of all moves under the free end of the spring 5, and the lines of force 8 of the magnet 6 are concentrated on the surface of the spring 5. When the hollow shaft 1 moves further to the position illustrated in FIG. 3c, then the freely moving part of the spring 5 is driven with it, since the lines of force 8 of the magnet 6 search for the path of least magnetic reluctance that is offered to them by the spring 5, on the basis of the reluctance principle. When the hollow shaft 1 moves further in the rotation direction, then the point is reached at which the restoring force of the spring 5 overcomes the driving force of the magnet 6, and the spring 5 snaps back. During this process, it moves into the influence area of the magnet 7, whose lines of force 9 run in the opposite direction to the lines of force 8 of the magnet 6. When the spring 5 changes between the positions illustrated in FIGS. 3c and 3d, this results in sudden remagnetization of the spring 5, which produces a strong voltage pulse in the coil 4 surrounding the spring 5, as is illustrated in FIG. 4. FIG. 4 also shows that the polarity of the induced voltage pulses 11, 12 depends on the rotation direction as indicated by the arrows 13 and 14, that is to say on whether the spring 5 is acted on by the magnet 6 first of all and then by the magnet 7 or, conversely, by the magnet 7 first and then by the magnet 6. Voltage pulses 11, 12 are obviously likewise produced when a linear movement takes place in the direction of the arrows 15, 16.

Figure 5:
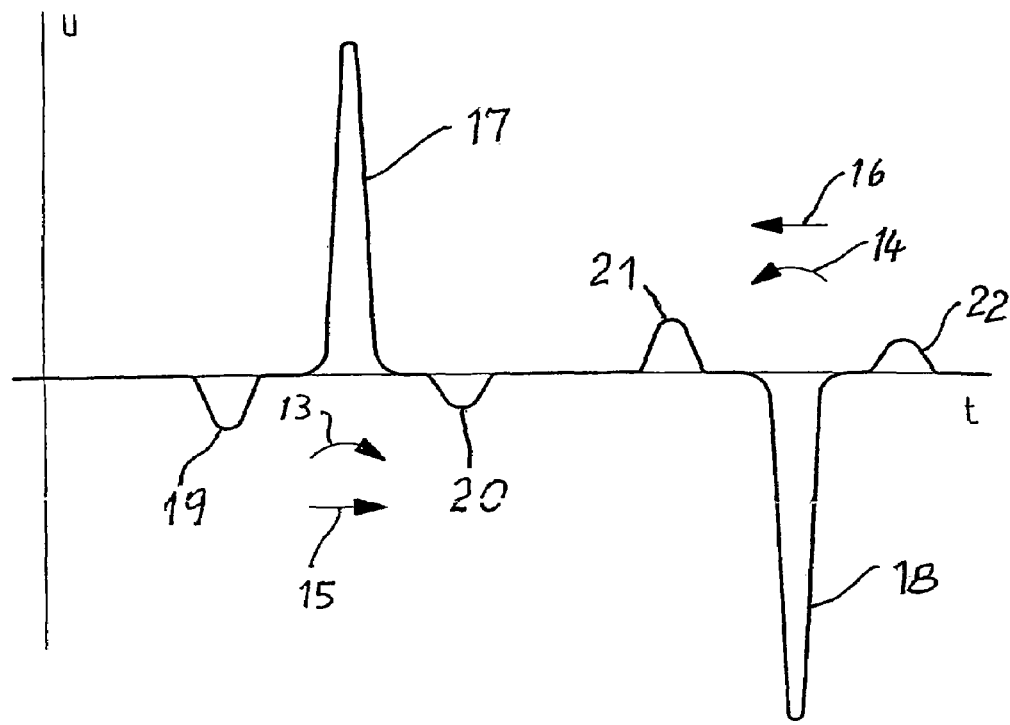
FIG. 5 shows the voltage pulses which are produced when the tachometer shaft is rotating at high speed, and their dependence on the rotation direction.

FIG. 5 shows the relationships for the situation in which the hollow shaft 1 is rotating at higher rotation speeds. Because of the increased speed with which the magnets 6, 7 pass the spring 5, sufficiently large voltage pulses 17, 18 are generated just on the basis of the rapid magnetic polarity change, irrespective of the movement of the spring 5. The initial and subsequent pulses 19, 20 and 21, 22, respectively illustrated in FIG. 5 result simply from the fact that a small voltage pulse is produced when one of the two magnets 6 or 7 moves under the spring 5, with this small voltage pulse being considerably less than the main voltage pulse which is produced by the magnetic pole change.

Figure 6:
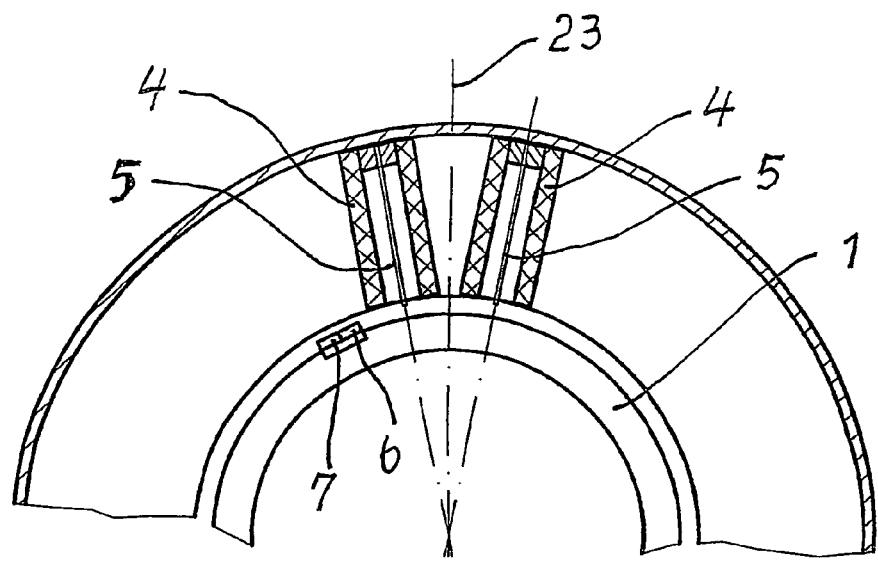
FIG. 6 shows a section, corresponding to that in FIG. 1, through a slightly modified apparatus.

The described apparatus makes it possible to unambiguously determine the number of revolutions of the hollow shaft 1 and its rotation direction using only one spring 5 and one coil 4. If the tachometer is intended to be connected to a so-called single-turn absolute transmitter which, as the name says, detects the absolute position within one revolution, while the tachometer counts the number of complete revolutions carried out, then, as is shown in FIG. 6, at least two coils 4 equipped with springs 5 should be provided. In order in this case to ensure unambiguous synchronization between the single-turn part and the multiturn part, the single-turn transmitter is positioned on the hollow shaft 1 such that its transition from "complete revolution" (=360°) to "start of the revolution" (=0°) coincides with the axis of symmetry 23.

Figure 7:
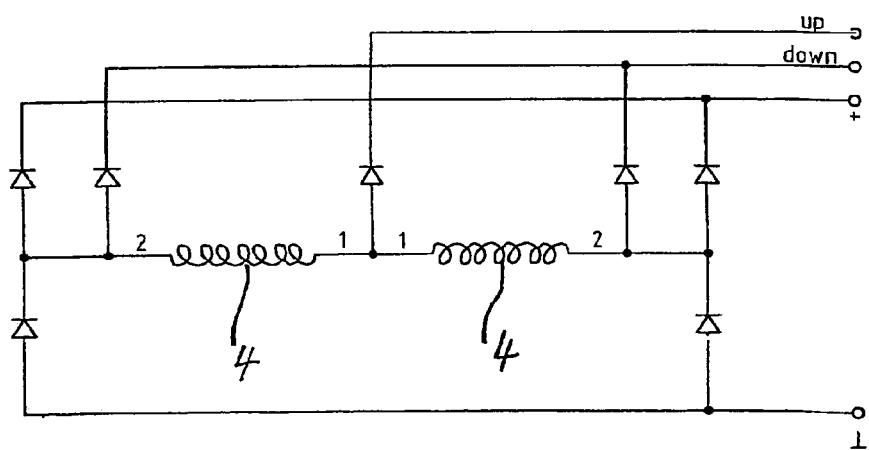
FIG. 7 shows the electrical circuit by means of which the voltages which are produced in the coils of the apparatus shown in FIG. 6 are rectified and are supplied to an electronic counting circuit.

FIG. 7 shows how the voltages which are produced in the coils 4 (which are connected electrically back-to-back in series) in the arrangement as shown in FIG. 6 can be rectified by diodes and can be used to supply an electronic counting circuit, which is not illustrated, and how up and down signals can be obtained in a simple manner.

Figure 8:
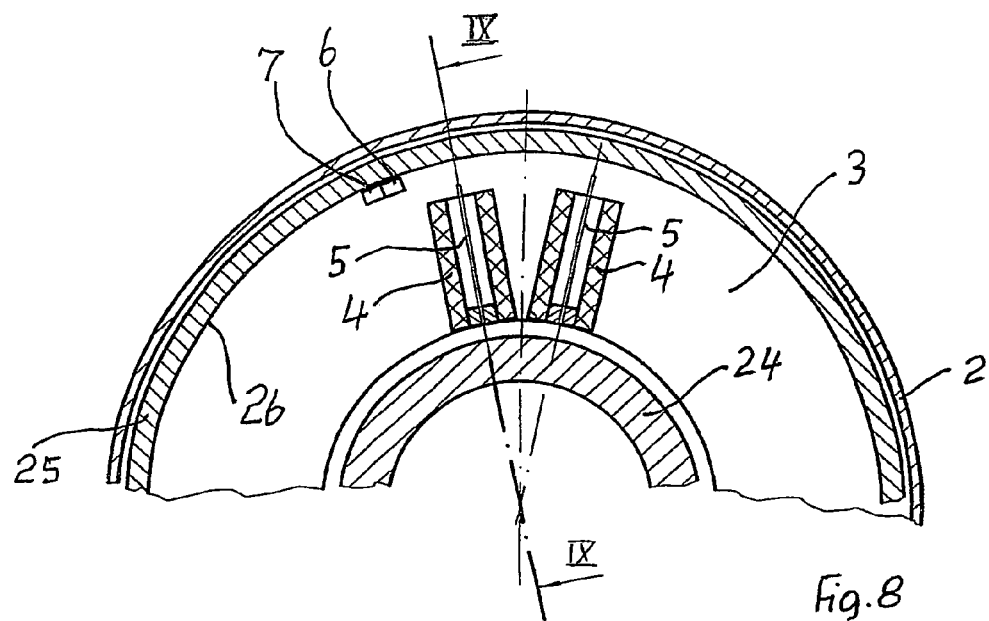
FIG. 8 shows a section, corresponding to that in FIG. 6, through a tachometer in the form of a so-called external rotor.
Figure 9:
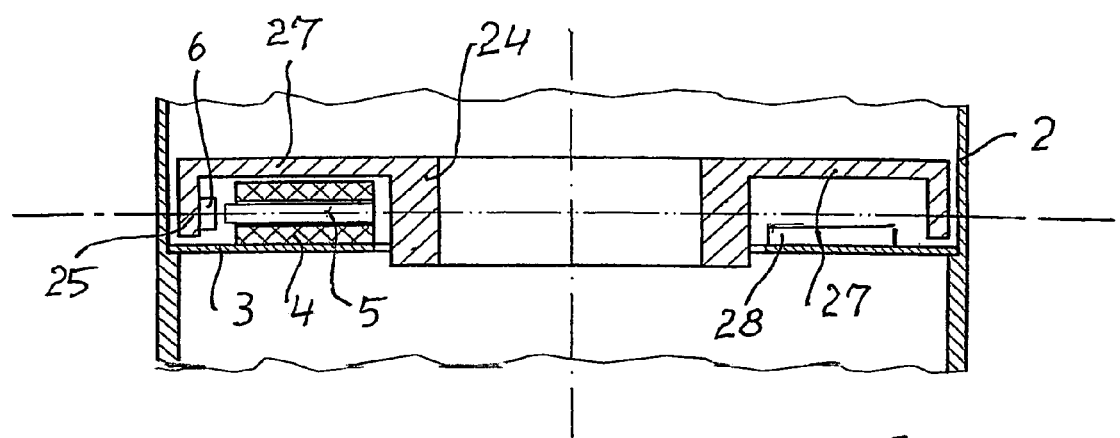
FIG. 9 shows a section along the line IX-IX in FIG. 8.

While the embodiments described so far relate to tachometers that are referred to as so-called internal rotors, FIGS. 8 and 9 illustrate a tachometer of the so-called external-rotor type. In this type, the hollow shaft 24 is surrounded by a collar 25 which at least partially surrounds it and on whose inner wall 26 facing the hollow shaft 24 the magnets 6 and 7, which revolve together with the hollow shaft 24, are mounted. This solution not only has the advantage that the centrifugal forces which are exerted on the magnets 6, 7 at relatively high rotation speeds are recorded well, but that, furthermore, magnetic interference fields are shielded by the annular collar 25 and the flange 27 which connects this collar 25 to the hollow shaft 24, from the coils 4 and from the electronic circuit 28 which is accommodated on the printed circuit board 3.

Figure 10:
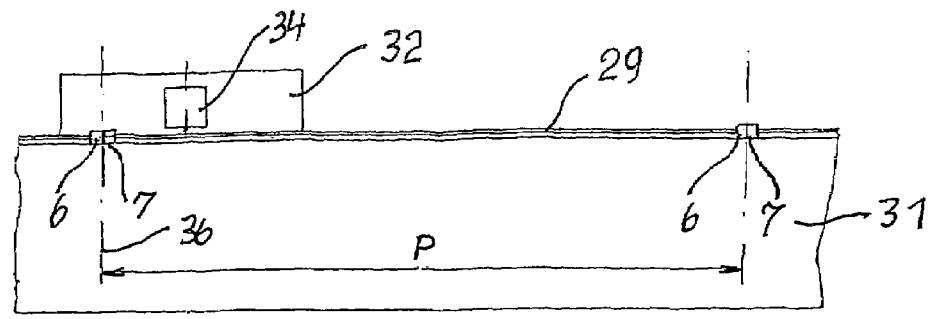
FIG. 10 shows a side view of the major parts of an apparatus which is used in conjunction with a machine tool.
Figure 11:
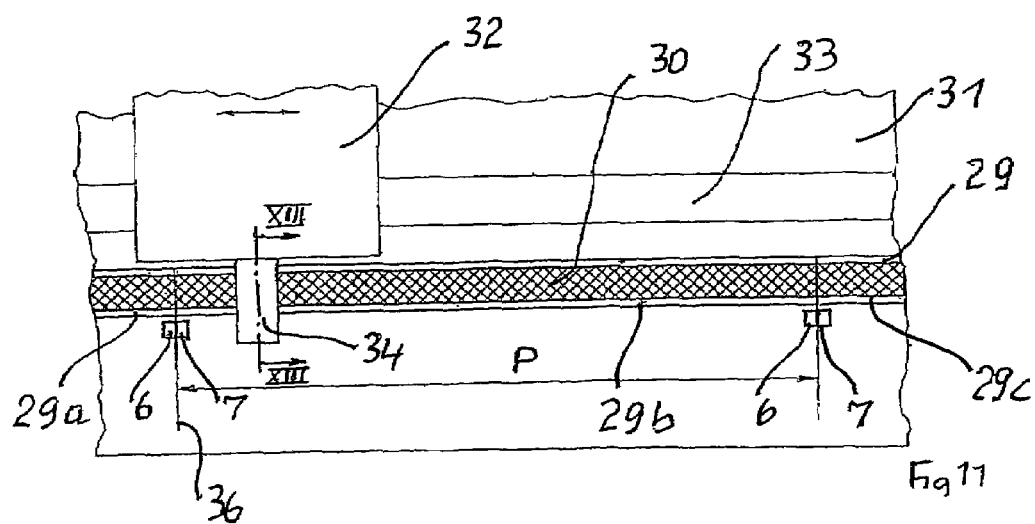
FIG. 11 shows a plan view of the parts illustrated in FIG. 10.
Figure 12:
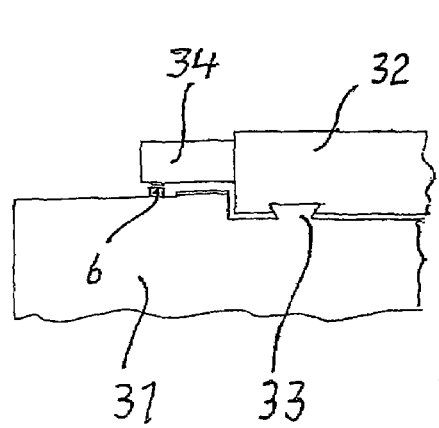
FIG. 12 shows an end view of the parts illustrated in FIG. 10.
Figure 13:
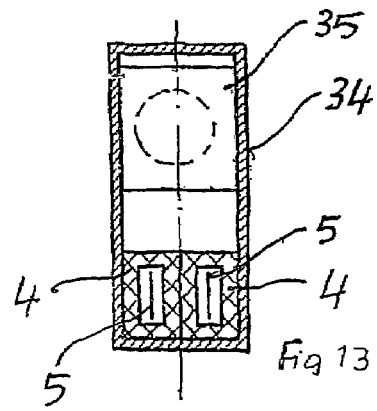
FIG. 13 shows a section along the line XIII-XIII in FIG. 11, FIGS. 14a-d show an illustration, corresponding to FIGS. 3a to 3d, of the interaction between the magnets and the leaf spring in the apparatus according to the alternative solution.

FIGS. 10 to 12 show a further possible way to use the apparatus carrying out the function of a voltage generator. In the figures, 29 denotes a linear scale which is provided with a coding 30, which is known and will therefore not be explained in any more detail, and is indicated by crossed lines, in order to allow an absolute measurement. The linear scale, which is fitted to the bed 31 of a machine tool, comprises a plurality of sections 29a, 29b and 29c, which allow it to be produced at low cost. In addition to the scale 29, magnet pairs which each comprise two magnets 6 and 7 are arranged in the area of the abutment points between the abovementioned sections, with the distance between centers P of the magnet pairs corresponding to the length of in each case one section 29a, 29b or 29c of the scale 29. The object which carries out a movement with respect to the magnet pairs 6, 7 is in the illustrated case formed by a carriage 32 which can be moved backwards and forwards along guide tracks 33, only one of which is shown. A sensor head 34 is mounted on the carriage 32 and—as can be seen in FIG. 13—has scanning electronics 35, which read the coding, and two coils 4, each of which in turn surrounds one spring 5.

When the sensor head 34 passes the magnet pair 6, 7, as shown on the left in FIGS. 10 and 11, from left to right, then the coils 4, 4 signal to a non-volatile memory for the evaluation electronics that the separating line 36 between the sections 29a and 29b has been crossed over, and that the sensor head 34 is in the area of the section 29b. There, the scanning electronics 35 determine an absolute position which occurs only once on the section 29b within that section, that is to say in the region of the distance P. The absolute position of the carriage 32 on the bed 31 of the machine tool can be determined from the value which is stored in the non-volatile memory and was obtained with the aid of the two coils 4, and from the value currently being read by the scanning electronics 35.

The use of two position measurement systems each comprising one spring 5 and one coil 4 has been found to be worthwhile to ensure that any position errors of the magnets 6, 7 resulting from the physical distance between the springs 5 and within the range of permissible installation tolerances do not lead to errors in the identification of the sections a-c of the linear scale 29. The described solution allows long and in consequence expensive linear scales to be replaced by a plurality of short linear scales, which can be produced with considerably less effort.

Figure 3C:
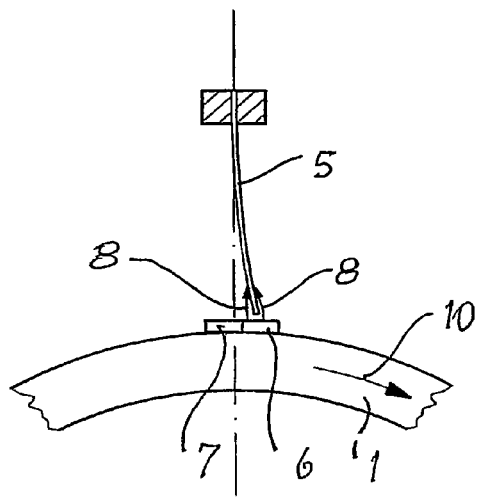
Figure 3D:
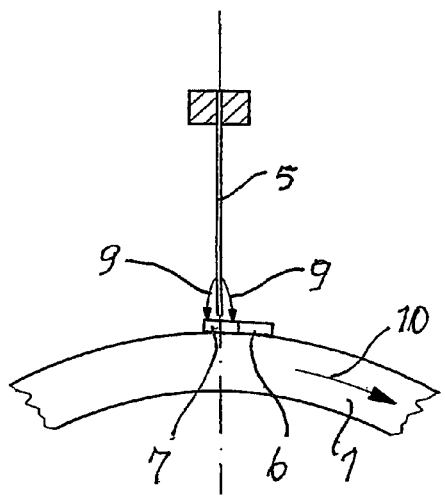
Figure 4:
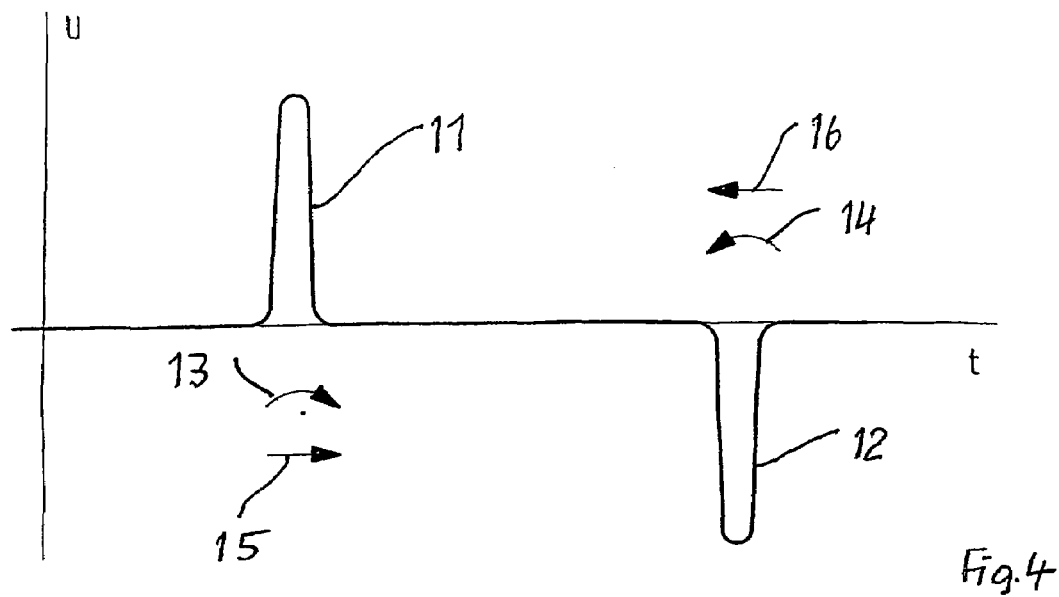
FIG. 4 shows voltage pulses which are produced when the shaft of the tachometer is rotating at low speed, and their dependency on the rotation direction.

When the magnet 6 in the case of FIGS. 3a to 3d approaches the leaf spring 5, then the force of attraction between the magnet 6 and the leaf spring 5 leads to a certain amount of acceleration of the drive shaft of the tachometer. The acceleration is followed by a deceleration as soon as the leaf spring 5 is driven by the magnet 6 and, as is illustrated in FIG. 3c, is deflected. The deceleration is finished suddenly, as soon as the free end of the leaf spring 5 jumps over to the magnet 7, so to speak. The cessation in the deceleration extends over only a short instant since the magnet 7 then once again deflects the leaf spring 5 which once again leads to a deceleration in the movement of the shaft of the tachometer. This deceleration ceases as soon as the restoring force of the leaf spring 5 exceeds the force of attraction between it and the magnet 7. As already mentioned in the introduction, the torque pulsations which result from the relationships described above, particularly in the case of tachometers with which relatively small drives are equipped, have a disturbing effect, quite apart from the fact that the leaf spring is caused to oscillate under the influence of the pulsations, which can lead to noise being developed.

Figure 14:
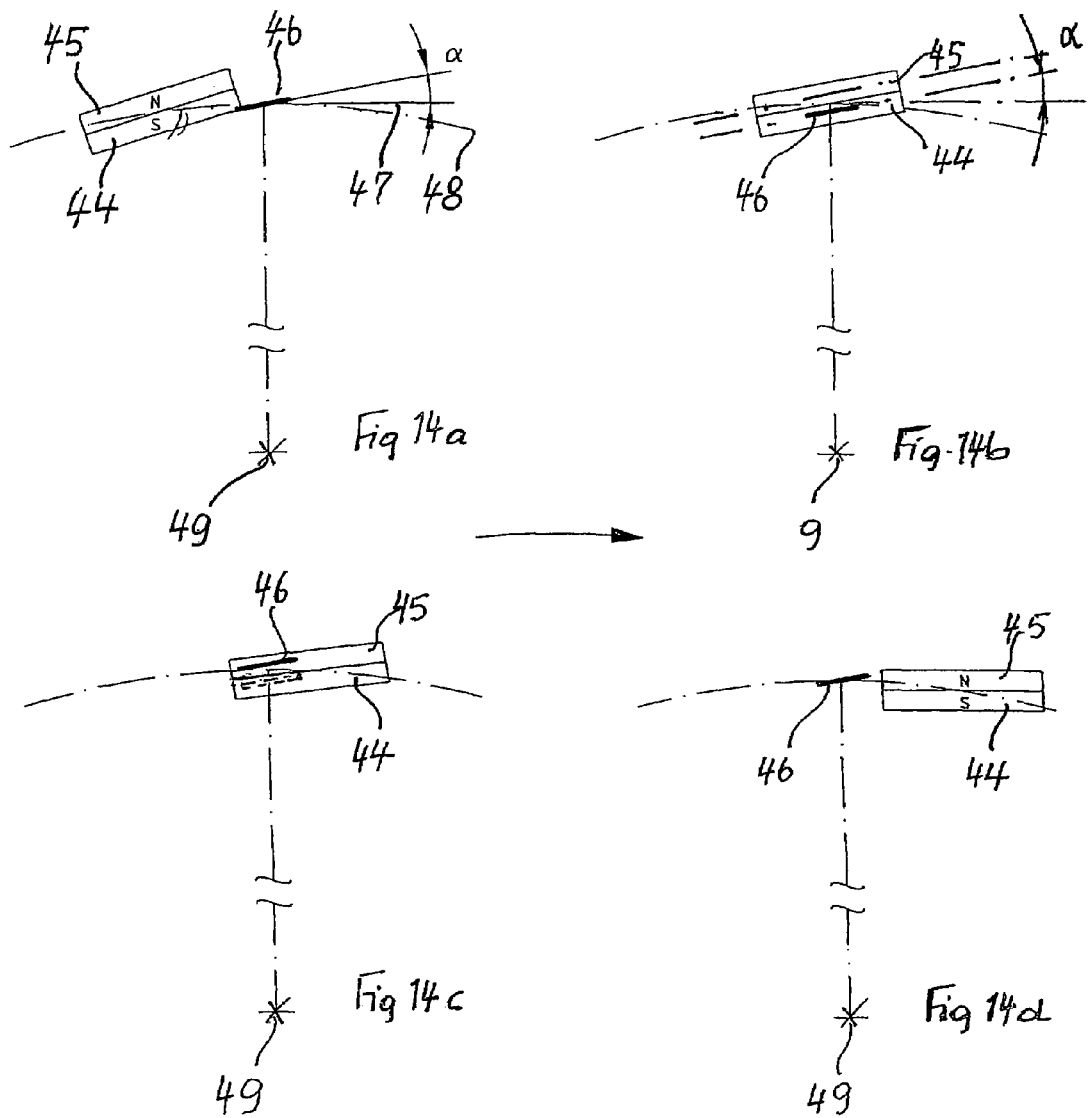

FIGS. 14a to 14d illustrate, schematically, how the described torque pulsations can be attenuated in the sense of the invention in such a way that they no longer have a disturbing effect. In contrast to the situation in FIGS. 3a to 3d, both the longitudinal axes of the essentially rectangular pole surfaces of the revolving permanent magnets 44, 45 of opposite polarity and the end surfaces of the fixed leaf spring 46 assume an angle α to the tangent 47 to the movement path 48 (which in this case is in the form of a circle) of the magnets 44, 45 in FIGS. 14a to 14d. The angle α is considerably less than 90°, and in practice is 20 to 30°. When the magnets 44, 45 move towards the leaf spring 46 in the illustrated case, then this results in only a minor accelerating torque, since the leaf spring 46 faces the magnet 44 only on its narrow face. When, as is shown in FIG. 14b, the leaf spring 46 moves into the area of the pole surface of the magnet 44, then the magnet 44 tries to keep the leaf spring 46 on its center axis as far as possible, on the basis of the reluctance effect. As the movement of the magnet 44 progresses, the leaf spring 46 is in consequence forced inwards by a specific amount from its initial position, that is to say in the direction of the longitudinal axis 49 of the tachometer. While the restoring force of the leaf spring 46 exceeds the reluctance force, then the leaf spring 46 jumps from the position shown by a dashed line in FIG. 14c to the position illustrated as a solid line. In this case, a sudden magnetic flux change takes place, which is also used to produce a voltage pulse in the case of the already described apparatuses. When the magnets 44, 45 which are arranged alongside one another move further—as indicated in FIG. 14d—then the magnet 45 releases the leaf spring 46 again. Since the narrow face of the leaf spring 46 in this case moves out of the area of the influence of the magnet 45—and this is in any case in a position which corresponds to its initial position—the braking torque which occurs before it emerges remains small.

When the movement of the permanent magnets 44, 45 is reversed, the leaf spring 46 is attracted by the magnet 45 and is deflected outwards by it. It then jumps over to the magnet 44, producing a voltage pulse, from which magnet 44 it is finally released again in the position shown in FIG. 14a.

Both the pole surfaces of the magnets 44, 45 and that end surface of the leaf spring 46 which faces the pole surfaces when voltage is produced are—as already mentioned—essentially rectangular, although the longitudinal sides of the rectangles may be curved. The latter applies in particular for the touching longitudinal faces of the magnets 44, 45 which are arranged alongside one another. It has been found to be advantageous for the magnets 44, 45 to have rectangular cross sections whose length is two to three times greater than the length of the leaf spring 46.

Figure 15:
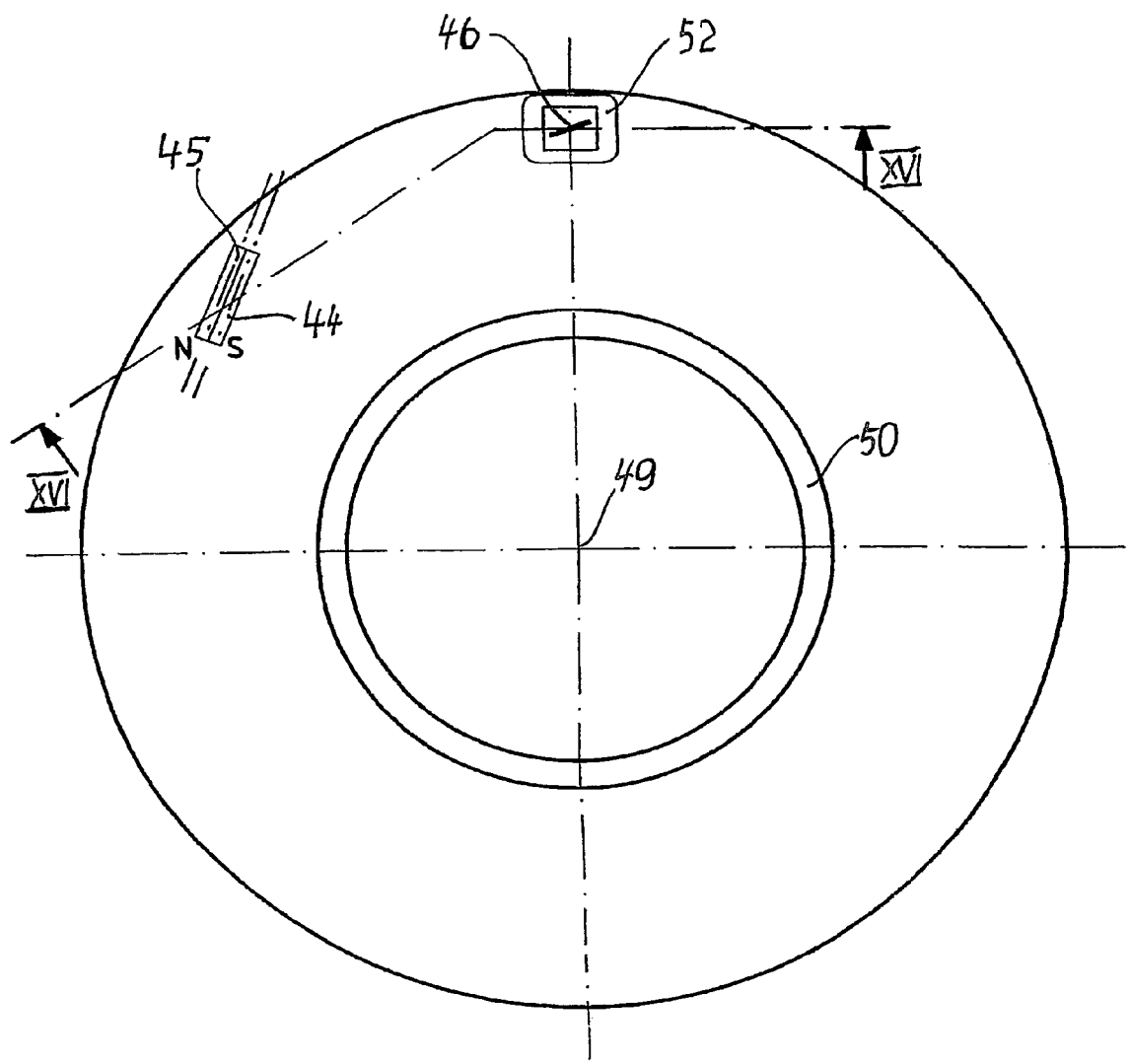
FIG. 15 shows the position of the magnets, of the leaf spring and of a coil which partially surrounds the leaf spring in a tachometer according to the alternative solution.
Figure 16:
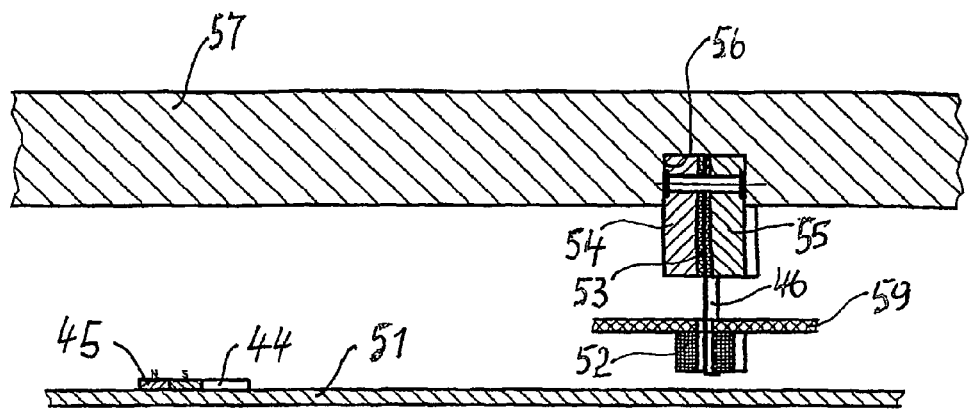
FIG. 16 shows a section along the line XVI-XVI in FIG. 15, on an enlarged scale.

FIG. 15 shows, in a highly schematic form, an end view of those parts of a tachometer having a hollow shaft 50 which are significant to the present invention, in which case a mount 51, to which the permanent magnets 44, 45 are fitted and which is connected to the hollow shaft 50, is illustrated in FIG. 16 and is in the form of an annular disk, has been omitted for clarity reasons.

Details of the mounting of the leaf spring 46 and of the arrangement of a coil 52 which partially surrounds it can be found in FIG. 16. As can be seen, the lower end of the leaf spring 46 is clamped in between two plates 54, 55, which are preferably composed of plastic, with the interposition of an oscillation-damping material 53, with these plates 54, 55 being mounted in a recess 56 in one wall 57 of the housing of the tachometer. The free end of the leaf spring 46 projects through an opening 58 in a printed circuit board 59 which is fitted, inter alia, with the coil 52.

Figure 17:
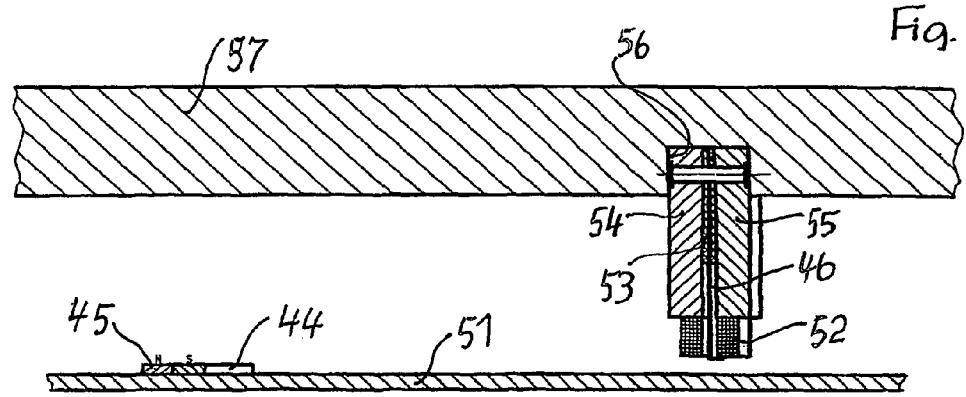
FIG. 17 shows a section, corresponding to FIG. 16, through a first modified embodiment.
Figure 18:
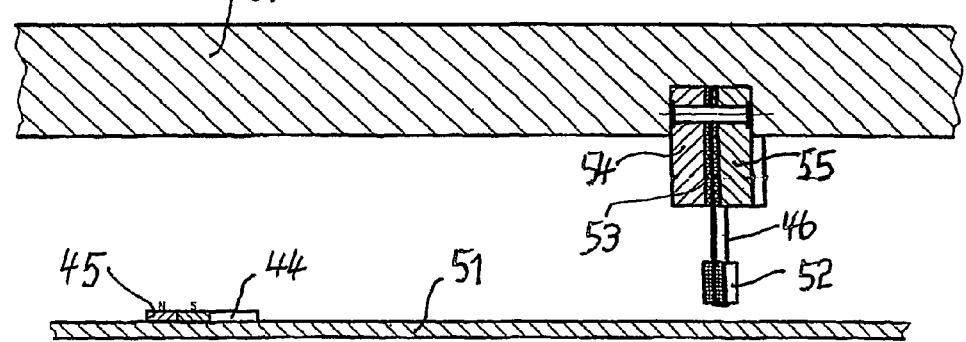
FIG. 18 shows a section, corresponding to FIG. 16, through a second modified embodiment.

FIGS. 17 and 18 show possible modifications of the arrangement shown in FIG. 16. In FIG. 17, the coil 52 is mounted on the end surfaces of the lengthened plates 54, 55. In FIG. 18, the free end of the leaf spring 46 is used as a holder for the coil 52.

Figure 19:
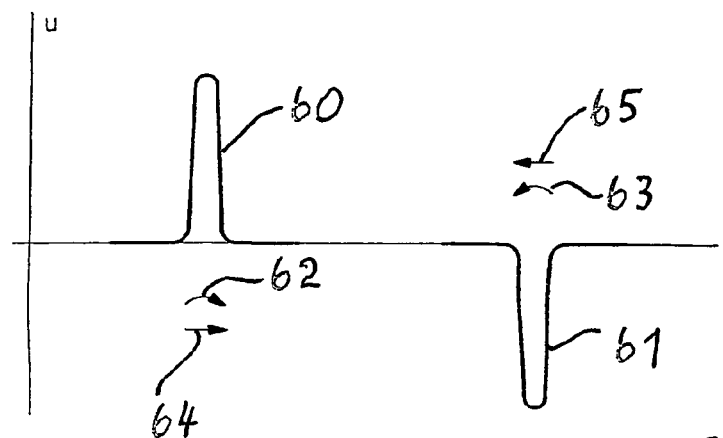
FIG. 19 shows the voltage pulses which are produced when the shaft of the tachometer as shown in FIG. 15 is rotated at low speed, as a function of the rotation direction.

In FIG. 19, the voltage pulses 60, 61 which are induced in the coil 52 at slow rotation speeds are shown as a function of the rotation directions indicated by arrows 62, 63. Corresponding voltage pulses are obviously also produced in the event of linear movements in the direction of the arrows 64, 65.

Figure 20:
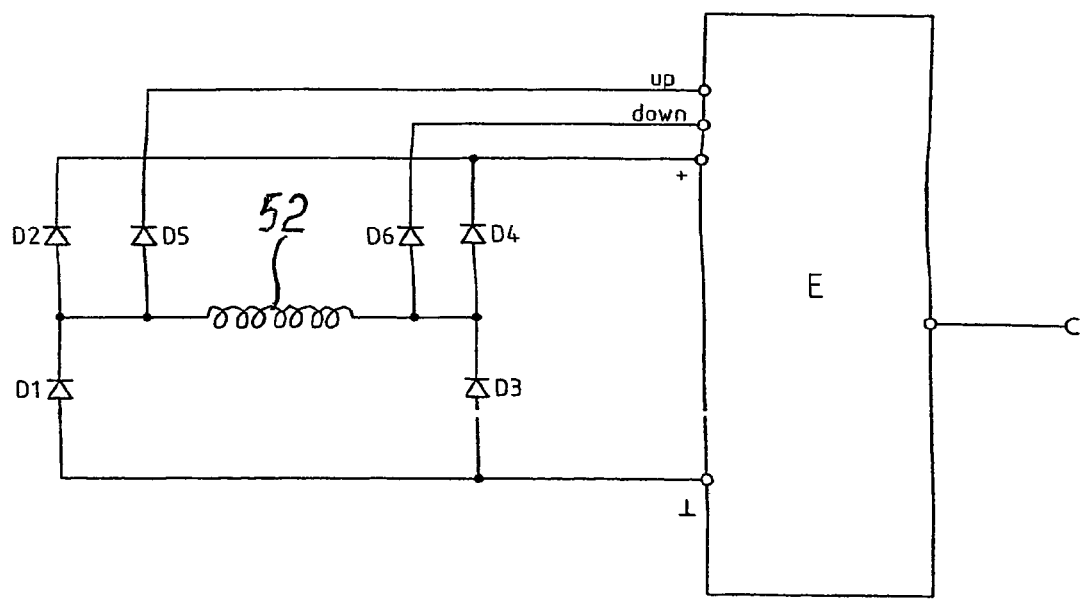
FIG. 20 shows the electrical circuit by means of which the voltages which are produced in the coil of the apparatus shown in FIG. 15 are rectified and are supplied to an electronic counting circuit.

FIG. 20 shows a circuit using which the voltage pulses 60 and 61, respectively, produced in the coil 52 are rectified by means of respective diodes $D_1$ and $D_4$, and are supplied as a supply voltage to an electronic counting circuit E. The counting circuit, which is in the form of a microprocessor circuit, is additionally supplied with an up signal and a down signal, respectively, via the diodes $D_5$ and $D_6$, as a function of the polarity of the voltage pulses which are produced.

Figure 21:
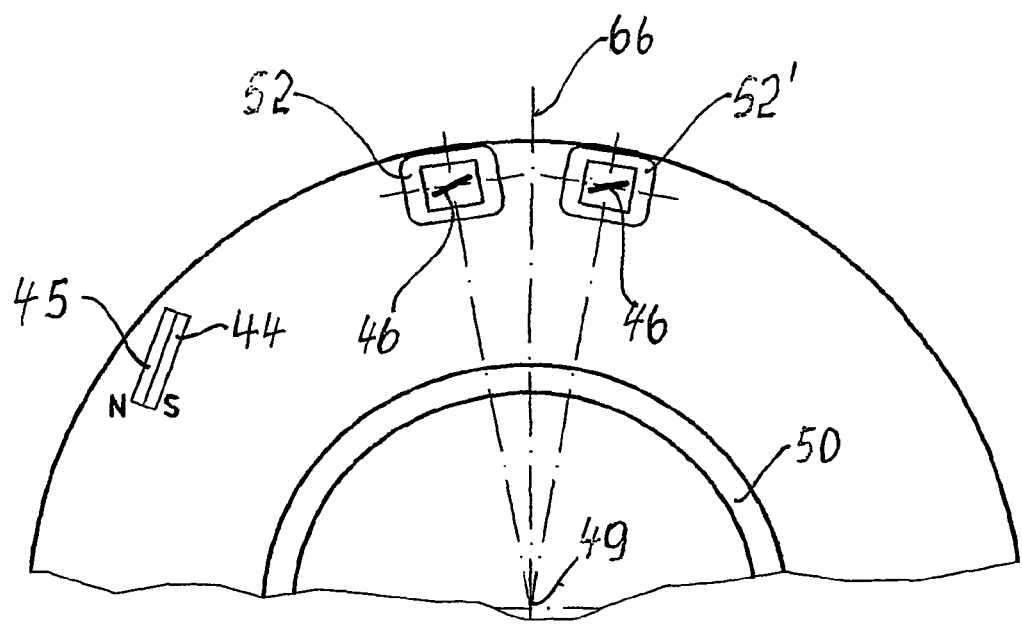
FIG. 21 shows the arrangement of the magnets and of the leaf spring on which they act in a so-called multiturn transmitter.

The described apparatus allows the number of revolutions of the hollow shaft 50 and its rotation direction to be unambiguously determined using only one spring 46 and one coil 52. If the tachometer is intended to be connected to a so-called single-turn absolute transmitter which, as the name says, detects the absolute position within one revolution, while the tachometer counts the number of complete revolutions carried out then, as is shown in FIG. 21, at least two coils 52 and 52' equipped with springs 46 should once again be provided. In order to ensure unambiguous synchronization between the single-turn part and the tachometer in this case, the single-turn part is also in this case positioned on the hollow shaft 50 such that its transition from "full revolution" (=360°) to "start of the revolution" (=0°) coincides with the axis of symmetry 66.

Figure 22:
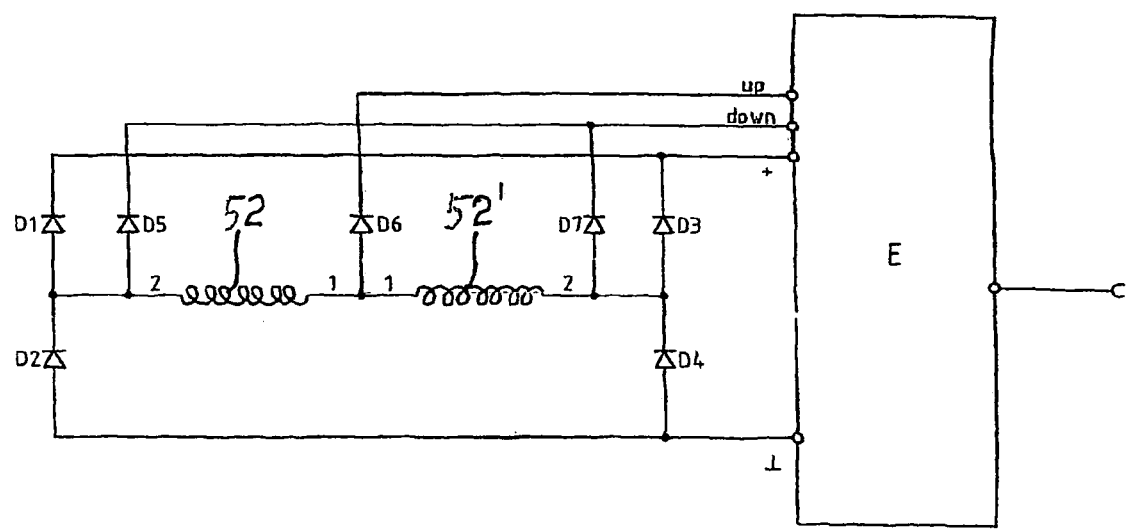
FIG. 22 shows a circuit diagram of the apparatus shown in FIG. 21.

FIG. 22 shows how the voltages which are produced in the coils 52 (which are connected electrically back to back in parallel) in the arrangement shown in FIG. 21 can be rectified by diodes $D_1$-$D_4$ and can be used to supply an electronic counting circuit E, and how up and down signals can be obtained in a simple manner via the diodes $D_1$-$D_4$.

Figure 23:
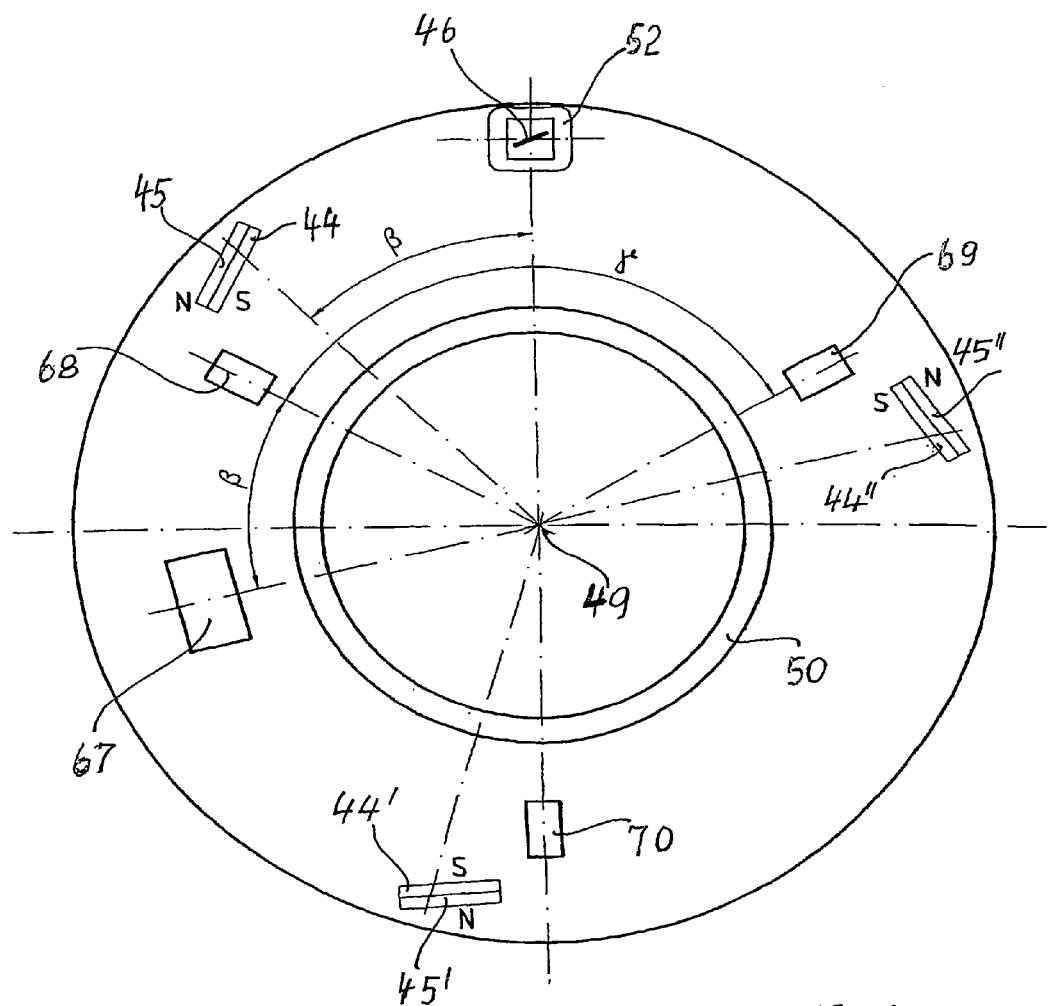
FIG. 23 shows an apparatus in which the leaf spring and the coil are used only for supplying voltage to a microprocessor circuit and for checking sensors which are used for counting purposes.

While, in the case of the embodiments described above, the voltage pulses which are produced in the coils 52 have been used both to supply power to the counting circuit E and for revolution counting, FIG. 23 illustrates a solution in which the coil 52 which partially surrounds the leaf spring 46, and three permanent magnet pairs 44, 45; 44', 45' and 44", 45", are used only to supply power to a counting circuit E. In contrast, the rotation speed is detected by means of an actuator 67 and three fixed sensors 68, 69 and 70, which can be driven by it. When, in the case of the apparatus shown in FIG. 23, the magnets 44, 45 move through an angle β in the clockwise direction, then they reach the coil 52 and the leaf spring 46 at a time at which the actuator 67 acts on the sensor 68 after carrying out a movement through the same angle β. When the mount (which has also been omitted in FIG. 23 for clarity reasons but in practice rotates above the plane of the drawing) for the magnet pairs 44, 45; 44', 45' and 44", 45" and the actuator 67 rotate further through an angle γ of 120°, then the magnets 44', 45' now operate the leaf spring 46, while the actuator 67 at the same time activates the sensor 69. When the mount rotates further through an angle γ, the magnet pair 44", 45" act on the spring 46, and the actuator 67 activates the sensor 70.

Figure 24:
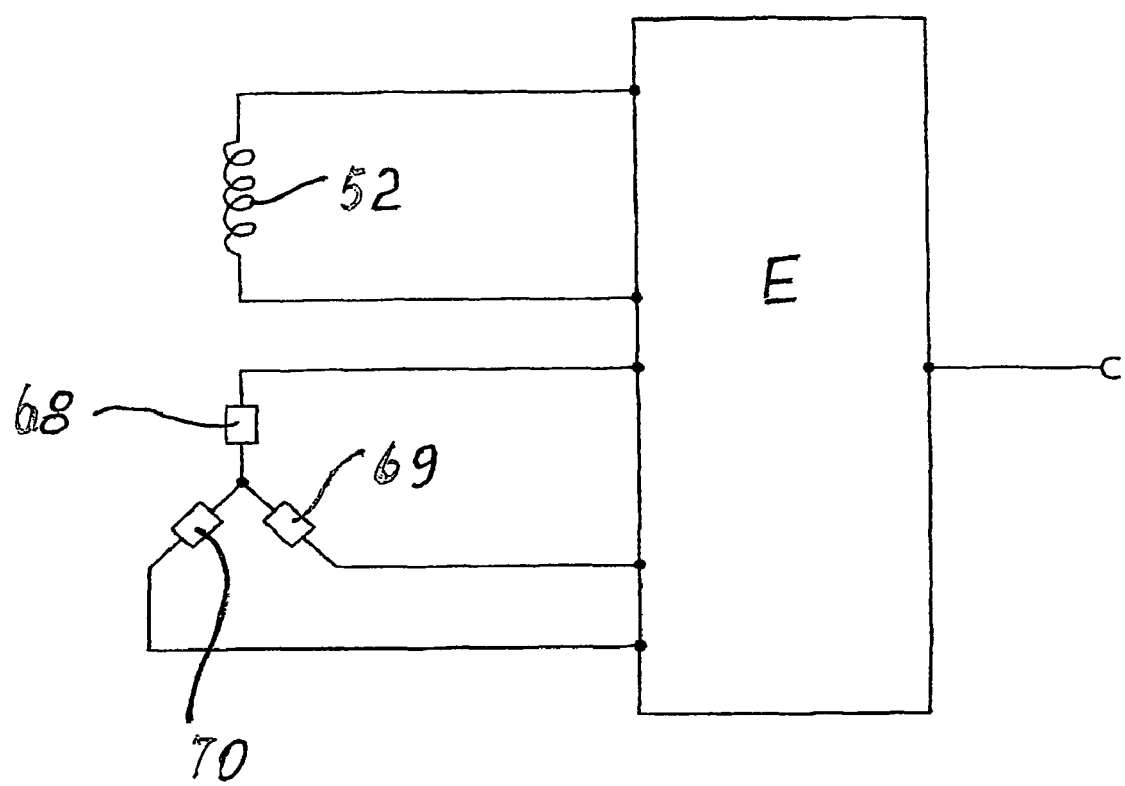
FIG. 24 shows a schematic circuit diagram of the apparatus shown in FIG. 23.

In the illustrated situation, although this is not absolutely essential, both the magnet pairs 44, 45; 44', 45' and 44", 45" which rotate about the axis 49 of the tachometer and the fixed sensors 68, 69, 70 are in each case offset through 120° with respect to one another, with the sensor 70 being diametrically opposite the coil 52. In consequence, at low rotation speeds, the spring 46 is triggered three times per revolution of the hollow shaft 50 of the tachometer. Whenever the spring 46 and the coil 52 are triggered, one of the sensors 68, 69, 70 is activated at the same time, and the microprocessor circuit E that is illustrated in FIG. 24 checks its status. A microprocessor uses the sequence of the sensors 68, 69 and 70 which are activated by the actuator 67 to identify the rotation direction in a known manner, and derives up or down counting pulses from this. Interference pulses, which can occur for example on operation of a motor parking brake in the coil 52, do not lead to incorrect counting, since a counting process takes place only when the coil 52 produces a voltage pulse and one of the sensors 68, 69 and 70 is driven at the same time.

The actuator 67 may be a magnet which, for example, drives MR or Hall sensors, or else Reed contacts. However, it is also possible to use photosensitive sensors. In this case, an opening is provided in the mount for the magnet pairs, instead of the actuator 67, through which a light beam can pass from light-emitting diodes which are arranged in a fixed position with respect to the sensors, like them.

The invention claimed is:

1. An apparatus for the detection of movements and/or positions of an object, in which a voltage pulse is in each case produced as a function of the movements and/or positions of the object in at least one coil, by means of at least one magnetic field which carries out a relative movement with respect to the coil and acts on it, with the coil at least partially surrounding a spring which is composed of magnetically permeable material and carries out a reciprocating movement under the influence of the magnetic field, on the basis of the reluctance effect, characterized in that the magnetic field is produced by a magnet pair comprising two adjacent magnets (6, 7) of opposite polarity, which are arranged one behind the other in the direction of movement of the object (1, 24, 32) and whose longitudinal axes, in the same way as the longitudinal axes of the coil (4), are oriented essentially at right angles to the movement direction of the object, and in that the reciprocating movement of the spring (5) causes a polarity change, which produces the respective voltage pulse, in the magnetic field with respect to the coil (4).

2. The apparatus as claimed in the precharacterizing clause of claim 1, characterize in that the magnetic field is produced by a magnet pair whose magnets (44, 45) are arranged alongside one another when viewed in the direction of their relative movement with respect to the coil (52), with both the pole surfaces of the magnets (44, 45) and that end surface of the leaf spring (46) which faces the pole surfaces of the magnets (44, 45) being essentially in the form of rectangles, whose longitudinal axes include an angle ($\alpha$) of less than 60° with the tangent to the movement path (48) of the magnets (44, 45), and in that the reciprocating movement of the spring (46) causes a polarity change, which produces the respective voltage pulse, in the magnetic field in the coil (52).

3. The apparatus as claimed in claim 1, characterized in that the spring (5; 46) is in the form of a leaf spring which is clamped in at one end.

4. The apparatus as claimed in claim 1, characterized in that the mutually directly adjoining magnets (6, 7; 44, 45) are firmly connected to a moving mount (1; 26; 31; 51).

5. The apparatus as claimed in claim 1, characterized in that the moving object (1) is formed by the shaft of a tachometer.

6. The apparatus as claimed in claim 5, characterized in that the shaft (1) of the tachometer is provided with a concentric collar (25) which at least partially surrounds it and on whose inner wall (26) facing the shaft (1) the magnets (6, 7) are mounted.

7. The apparatus as claimed in claim 6, characterized in that at least one coil (4), which is provided with a spring (5), is arranged in the space between the inner wall (26) of the collar (25) and the shaft (1).

8. The apparatus as claimed in claim 1, characterized in that at least one coil (4), which is provided with a spring (5), is arranged in a sensor head (34) which is connected to an object (32) which moves along a scale (29), with the scale to be scanned by the sensor head (34) comprising at least two sections (29a, 29b) at which abutment or joining point a magnet pair (6, 7), which interacts with the coil (4), is in each case arranged.

9. The apparatus as claimed in claim 8, characterized in that the sensor head (34) is equipped with two coils (4, 4) which each surround one spring (5).

10. The apparatus as claimed in claim 8, characterized in that the scale (29) is in the form of a linear scale which is provided with an absolute coding (30) which can be read by scanning electronics (35) of the sensor head (34).

11. The apparatus as claimed in claim 8, characterized in that the moving object is formed by the carriage (32) of a machine tool.

12. The apparatus as claimed in claim 1, characterized in that the apparatus carries out the function of a voltage generator.

13. The apparatus as claimed in claim 1, characterized in that the voltage pulses which are produced can be used as signals which can be supplied to an electronic counting circuit.

14. The apparatus as claimed in claim 2, characterized in that the longitudinal axes of the essentially rectangular pole surfaces of the magnets (44, 45) include an angle ($\alpha$) of 20 to 30° with the tangent to the movement path of the magnets (44, 45).

15. The apparatus as claimed in claim 2, characterized in that both the width and the length of the pole surface of the magnets (44, 45) is greater than the width and the length of the end surface of the leaf spring (45).

16. The apparatus as claimed in claim 15, characterized in that the length and the width of the pole surfaces of the magnets (44, 45) are in each case, a multiple of the length and width of the end surface of the leaf spring (46).

17. The apparatus as claimed in claim 2, characterized in that the leaf spring (46) is clamped in at its end facing away from those pole surfaces of the magnets (44, 45) which pass it, between two holding plates (54, 55) which are provided with damping inserts.

18. The apparatus as claimed in claim 1, characterized in that the free end of the spring (5; 46) projects slightly beyond the end of the coil (4; 52) which surrounds it.

19. The apparatus as claimed in claim 1, characterized in that the mount (51) is formed by a disk which is connected to the shaft (50) of a tachometer.

20. The apparatus as claimed in claim 1, characterized in that the magnets (6, 7; 44, 45), which are arranged in pairs, are associated with a plurality of coils (4, 4'; 52, 52') which are each equipped with one spring (5; 46).

21. The apparatus as claimed in claim 20 characterized in that the magnets (6, 7; 44, 45), which revolve with the shaft (1; 50), have two associated coils (4, 4', 52, 52'), which are each equipped with one spring (5; 46), and the distance between the coils (4, 4'; 52, 52'), is greater than the extent of the magnets (6, 7; 44, 45) in the direction of their movement.

22. The apparatus as claimed in claim 20, characterized in that the two coils (4, 4'; 52, 52') are in each case electrically connected back-to-back in series with one another.

23. The apparatus as claimed in claim 1, characterized in that the apparatus is provided with sensors (68-70) which can be acted on by means of at least one actuator (67) and are used for the detection of the movements and/or positions of an object, while the magnets (44, 45; 44', 45; 44", 45") are used only to supply power to a microprocessor circuit (E).

24. The apparatus as claimed in claim 23, characterized in that the actuator (67) is in the form of a magnet, and the sensors are in the form of MR or Hall sensors (68-70).

25. The apparatus as claimed in claim 2, characterized in that the spring (5; 46) is in the form of a leaf spring which is clamped in at one end.

26. The apparatus as claimed in claim 3, characterized in that at least one coil (4), which is provided with a spring (5), is arranged in a sensor head (34) which is connected to an object (32) which moves along a scale (29), with the scale to be scanned by the sensor head (34) comprising at least two sections (29a, 29b) at which abutment or joining point a magnet pair (6, 7), which interacts with the coil (4), is in each case arranged.

27. The apparatus as claimed in claim 4, characterized in that at least one coil (4), which is provided with a spring (5), is arranged in a sensor head (34) which is connected to an object (32) which moves along a scale (29), with the scale to be scanned by the sensor head (34) comprising at least two sections (29a, 29b) at which abutment or joining point a magnet pair (6, 7), which interacts with the coil (4), is in each case arranged.

28. The apparatus as claimed in claim 9, characterized in that the scale (29) is in the form of a linear scale which is provided with an absolute coding (30) which can be read by scanning electronics (35) of the sensor head (34).

29. The apparatus as claimed in claim 14, characterized in that both the width and the length of the pole surface of the magnets (44, 45) is greater than the width and the length of the end surface of the leaf spring (46).

30. The apparatus as claimed in claim 14, characterized in that the leaf spring (46) is clamped in at its end facing away from those pole surfaces of the magnets (44, 45) which pass it, between two holding plates (54, 55) which are provided with damping inserts.

31. The apparatus as claimed in claim 14, characterized in that the mount (51) is formed by a disk which is connected to the shaft (50) of a tachometer.

32. The apparatus as claimed in claim 21, characterized in that the two coils (4, 4'; 52, 52') are in each case electrically connected back-to-back in series with one another.

33. The apparatus as claimed in claim 14, characterized in that the apparatus is provided with sensors (68-70) which can be acted on by means of at least one actuator (67) and are used for the detection of the movements and/or positions of an object, while the magnets (44, 45; 44', 45; 44", 45") are used only to supply power to a microprocessor circuit (E).

* * * * *